US012683105B2

(12) United States Patent
Hofsaess

(10) Patent No.: US 12,683,105 B2
(45) Date of Patent: *Jul. 14, 2026

(54) TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 234 days.

This patent is subject to a terminal disclaimer.

(21) Appl. No.: 18/426,647

(22) Filed: Jan. 30, 2024

(65) Prior Publication Data

US 2024/0258053 A1 Aug. 1, 2024

(30) Foreign Application Priority Data

Jan. 31, 2023 (DE) .................... 10 2023 102 303.9

(51) Int. Cl.
*H01H 37/54* (2006.01)
*H01H 1/50* (2006.01)

(52) U.S. Cl.
CPC ........ *H01H 37/5427* (2013.01); *H01H 1/504* (2013.01)

(58) Field of Classification Search
CPC ............... H01H 37/5427; H01H 1/504; H01H 2037/5463; H01H 37/5418; H01H 37/02;
(Continued)

(56) References Cited

U.S. PATENT DOCUMENTS 5,973,587 A 10/1999 Hofsaess
6,031,447 A 2/2000 Hofsaess
(Continued)

FOREIGN PATENT DOCUMENTS

CN 205542584 U 8/2016
DE 19727197 A1 2/1999
(Continued)

OTHER PUBLICATIONS

Buehling Dieter, Oct. 26, 2000, Votup & Co Innovative Keramik, Entire Document (Translation of DE19917631). (Year: 2000).*
(Continued)

*Primary Examiner* — Stephen S Sul
(74) *Attorney, Agent, or Firm* — Reising Ethington P.C.

(57) ABSTRACT

A temperature-dependent switch having a housing and a temperature-dependent switching mechanism arranged therein. The temperature-dependent switching mechanism switches, depending on its temperature, between a closed position, in which the switching mechanism establishes an electrically conductive connection between a first external terminal and a second external terminal, and an open position, in which the temperature-dependent switching mechanism disconnects the electrically conductive connection. The two external terminals are led parallel alongside each other out of the housing so that their upper sides lie in a common connection plane. Arranged inside the housing is an electrical heating resistor component, which is electrically connected in parallel with the switching mechanism. The electrical heating resistor component has on a connection side a first contact area, which electrically contacts the upper side of the first external terminal, and a second contact area, which electrically contacts the upper side of the second external terminal.

14 Claims, 7 Drawing Sheets

(58) Field of Classification Search
CPC .. H01H 1/50; H01H 1/58; H01H 3/60; H01H 37/04; H01H 37/52
See application file for complete search history.

(56) References Cited

U.S. PATENT DOCUMENTS

| | | | | |
|---|---|---|---|---|
| 6,097,274 | A * | 8/2000 | Hofsass | H01H 37/5418 337/365 |
| 6,181,233 | B1 | 1/2001 | Hofsaess et al. | |
| 2011/0140827 | A1* | 6/2011 | Suzuki | H01H 37/5418 337/362 |
| 2014/0104730 | A1* | 4/2014 | Takeda | H01H 37/5418 361/26 |
| 2017/0062161 | A1* | 3/2017 | Takeda | H01H 37/5427 |
| 2024/0258052 | A1* | 8/2024 | Hofsaess | H01H 37/5427 |

FOREIGN PATENT DOCUMENTS

| | | | | |
|---|---|---|---|---|
| DE | 19752581 | A1 | 6/1999 | |
| DE | 19807288 | A1 | 9/1999 | |
| DE | 19917631 | A1 * | 10/2000 | H01C 7/021 |
| EP | 0951041 | A2 | 10/1999 | |
| JP | S61057502 | U | 4/1986 | |
| JP | H04332226 | A | 11/1992 | |
| JP | H11195364 | A | 7/1999 | |
| JP | 2017224570 | A | 12/2017 | |
| WO | WO2008006385 | A1 | 1/2008 | |

OTHER PUBLICATIONS

Examination Report issued by the Japanese Patent Office for application 2024-009302 on Dec. 10, 2025; English translation included.
Search Report issued by the European Patent Office for application 24152791.0 on Jun. 21, 2024.

* cited by examiner

TEMPERATURE-DEPENDENT SWITCH

CROSS-REFERENCE TO RELATED APPLICATIONS

This application claims priority from German patent application DE 10 2023 102 303.9, filed on Jan. 31, 2023. The entire content of this priority application is incorporated herein by reference.

FIELD

The present disclosure relates to a temperature-dependent switch.

BACKGROUND

An example of a temperature-dependent switch is disclosed in DE 197 52 581 A1. Another example of a temperature-dependent switch is disclosed in DE 198 07 288 A1.

Temperature-dependent switches of this type are used in a manner known per se to monitor the temperature of a device. For this purpose, the switch is brought into thermal contact with the device to be protected, for example by one of its external surfaces, so that the temperature of the device to be protected influences the temperature of the switching mechanism arranged inside the switch.

Using its external electrical connections, the switch is electrically connected in series into the supply circuit of the device to be protected by way of connecting cables, so that, below a response temperature of the switch, the supply current of the device to be protected flows through the switch.

A temperature-dependent switching mechanism installed in the switch ensures a temperature-dependent switching behaviour of the switch. This temperature-dependent switching mechanism is typically arranged between two electrodes, which in turn are electrically connected to one of the two external terminals each. The temperature-dependent switching mechanism is designed such that, below the response temperature of the switch or the response temperature of the switching mechanism, it is in a closed position, in which the switching mechanism establishes an electrically conductive connection between the two external electrical connections of the switch, and, if the response temperature of the switch is exceeded, it switches to an open position, in which the electrically conductive connection between the two external electrical connections of the switch is disconnected or interrupted.

In this way, the temperature-dependent switching mechanism ensures that, in its closed position, in which it is below the response temperature of the switch, it closes the supply circuit of the device to be protected and, in its open position, in which it is above the response temperature of the switch, it interrupts the supply circuit of the device to be protected. This means that such a temperature-dependent switch can be used to ensure that, in the event of undesired overheating, an electrical device is automatically de-energized by the switch, and thus switched off.

Such temperature-dependent switches thus provide protection against overtemperature in electrical devices of any type.

Usually responsible for the temperature-dependent switching behaviour of the switching mechanism of the switch is in particular a temperature-dependent switching element, which is configured to change its geometric shape depending on its temperature. This temperature-dependent switching element changes its geometric shape when the response temperature of the switch is reached and/or exceeded in such a way that it brings the switching mechanism from its closed position to its open position.

Typically, this temperature-dependent switching element is a bimetal or trimetal element, which is formed as a multi-layer, active, sheet-like component of two, three or more interconnected components with different thermal expansion coefficients. The connections between the individual layers of metals or metal alloys in such bimetal or trimetal elements are usually material-bonding or interlocking and are achieved for example by rolling.

Such a bimetal or trimetal switching element has a first stable geometric configuration (low-temperature configuration) at low temperatures, below the response temperature of the switch, which corresponds to the response temperature of this switching element, and a second stable geometric configuration (high-temperature configuration) at high temperatures, above the response temperature of the bimetal or trimetal switching element. The temperature-dependent switching element therefore switches from its low-temperature configuration to its high-temperature configuration temperature-dependently in the manner of a hysteresis.

In addition to the temperature-dependent switching element, also often used in switching mechanisms of such temperature-dependent switches is an additional spring element, which generates, or at least is involved in generating, the mechanical closing pressure of the switching mechanism in the closed position. The spring element is a temperature-independent spring element, which is preferably made of metal. This spring element acts in particular in the closed position of the switching mechanism to relieve the load on the switching element, since the latter then has to apply less or no force to generate the mechanical closing pressure in the closed position of the switching mechanism.

Regardless of whether such an additional spring element is provided or not, the switching behaviour of the switching mechanism is decisively determined by the temperature-dependent switching element as follows: If the temperature of the temperature-dependent switching element increases as a result of an increase in temperature in the device to be protected beyond the response temperature of the switching element, the switching element snaps from its low-temperature configuration into its high-temperature configuration and thereby brings the switching mechanism from its closed position to its open position, whereby the current flow through the switch is interrupted. If the temperature of the switch, and thus also of the temperature-dependent switching element, is subsequently reduced as a result of a cooling of the device to be protected below a so-called spring-back temperature of the switching element, the switching element changes its geometric shape from its high-temperature configuration to its low-temperature configuration, so that the switching mechanism is brought once more to its closed position, so that current can then flow through the switch again.

However, depending on the application, such switching back may be undesired. For safety reasons, it may be necessary for example that the switch is designed such that it does not automatically close again after a temperature-related opening when the device to be protected subsequently cools down again. For example, the switch is intended to be able to be closed again only after the device to be protected has not only cooled down, but has also been completely removed from the power supply.

A so-called self-holding function has been developed for such cases. In the switch disclosed in DE 197 52 581 A1, this self-holding function is brought about by a resistor of PTC material (Positive Temperature Coefficient thermistor or PTC thermistor), which is connected electrically in parallel with the switching mechanism, being arranged between the two electrodes of the switch.

As long as the switch remains in its low-temperature or closed position, no current flows through the PTC material connected as a parallel resistor. However, when the switch opens, a low self-holding current flows through the parallel resistor, which heats it up and ensures that the switch remains at a temperature above the response temperature of the bimetal switching element. The self-holding current is in this case so low that the electrical device to be protected does not suffer any further damage, and can therefore cool down. However, the self-holding resistance caused by the PTC element prevents the switch itself from cooling down again and correspondingly switching from its high-temperature or open position back to its low-temperature or closed position, which without the parallel resistor could lead to an iterative switching on and off of the electrical device to be protected.

The PTC element thus acts as a heating resistor, which heats up the switch even after a temperature-induced opening of the switch, as long as the electrical device to be protected is connected to the power supply, thus keeping the switch open. This self-holding function is also implemented in a similar way in the switch disclosed in DE 198 07 288 A1.

The two switches disclosed in the aforementioned documents (DE 197 52 581 A1 and DE 198 07 288 A1) differ essentially in the type of functional and structural design of the switching mechanism.

In the switch disclosed in DE 197 52 581 A1, the spring element and the temperature-dependent switching element in the switch are electrically and mechanically connected in parallel. In this type of design of the switching mechanism, the spring element and the temperature-dependent switching element are usually disc-shaped and coupled with each other for movement by a movable contact part. The spring element is designed as a spring disc, which is fastened centrally to the movable contact part. The temperature-dependent switching element is usually designed as a bimetal snap disc, which is slipped over the movable contact part with a central opening. In the closed position of the switching mechanism, the spring disc presses the movable contact part against a stationary mating contact, which is arranged on a first electrode of the switch or forms a first electrode of the switch and is electrically connected to an external terminal of the switch, and is supported by its outer edge on a second electrode of the switch, which is electrically connected to a second external terminal of the switch. In this way, in the closed position of the switch, the electrical current flows between the two electrodes by way of the spring disc, which at the same time generates the contact pressure with which the movable contact part is pressed against the stationary contact part. In the closed position of the switching mechanism, the bimetal snap disc can be mechanically mounted free from any forces and preferably also does not have current flowing through it, which has a positive effect on its service life.

In the switch disclosed in DE 198 07 288 A1, the spring element is electrically and mechanically connected to the temperature-dependent switching element not in parallel but in series. In this type of design of the switch, the spring element is typically formed as an elongated spring tongue made of metal and the temperature-dependent switching element as an elongated spring tongue made of bimetal or trimetal. One end of the spring element is fastened to a first electrode electrically connected to the first external terminal of the switch. An opposite second end of the spring element is firmly connected to the temperature-dependent switching element. The free end of the temperature-dependent switching element opposite from the end of the switching element fastened to the spring element carries a movable contact part. This movable contact part interacts with a stationary contact part which is arranged on a second electrode of the switch electrically connected to the second external terminal. In this type of design of the switching mechanism, in the closed position of the switching mechanism the movable contact part is therefore pressed against the stationary contact part by both the spring element and the temperature-dependent switching element. The spring element and the temperature-dependent switching element therefore jointly generate the closing pressure in the closed position of the switching mechanism due to their series connection and their fastening to each other.

Despite the different design of the switching mechanism, in the switches disclosed in the aforementioned documents (DE 197 52 581 A1 and DE 198 07 288 A1) the electrodes are in both cases arranged offset in height in relation to each other, wherein the temperature-dependent switching mechanism is arranged in a space between the two electrodes that is provided in the housing of the switch. In both switches, the PTC element provided for ensuring the self-holding function is also arranged between the two electrodes inside the housing spatially parallel to the switching mechanism. An upper side of the PTC element is electrically connected to one electrode. An opposite underside of the PTC element is electrically connected to the other electrode.

This type of arrangement of the PTC element requires it to be formed exactly in terms of its size, since the height of the PTC element must be very precisely adapted to the distance between the two electrodes. The PTC element must also be mounted very precisely to ensure electrical contacting with the two electrodes of the switch.

In both of the aforementioned switch designs, not only the electrodes but also the external terminals of the switch connected to them are generally offset in height and in each case led horizontally out of the housing of the switch. However, in order to make the electrical connection of the switch as easy as possible, it is desirable that the two external terminals lie in a common plane. In order to ensure this, it is generally necessary in conventional switches to bend the external terminals, which are usually formed as elongated plate-shaped metal sheets, outside the switch housing in order to bring the connections into a common plane. This is cumbersome and in the worst case can also lead to damage or even breakage of the external terminals.

SUMMARY

It is an object to provide a temperature-dependent switch with which the aforementioned disadvantages can be overcome. In particular, an object here is to provide a temperature-dependent switch with a self-holding function in which the heating resistor component provided for the self-holding function can be mounted more easily, in particular the electrical connection of which is to be more easily possible.

According to a first aspect, a temperature-dependent switch is presented that comprises a housing and a temperature-dependent switching mechanism arranged therein, wherein the temperature-dependent switching mechanism is configured to switch, depending on its temperature, between a closed position, in which the switching mechanism establishes an electrically conductive connection between a first external terminal and a second external terminal, and an open position, in which the temperature-dependent switching mechanism disconnects the electrically conductive connection. The two external terminals are led parallel alongside each other out of the housing in such a way that an upper side of the first external terminal lies with an upper side of the second external terminal in a common connection plane. Arranged inside the housing is an electrical heating resistor component, which is electrically connected in parallel with the switching mechanism. This heating resistor component has on a connection side a first contact area, which electrically contacts the upper side of the first external terminal, and a second contact area, which electrically contacts the upper side of the second external terminal.

The heating resistor component, which is electrically connected in parallel with the temperature-dependent switching mechanism, enables the switch to have the self-holding function explained at the beginning, by which undesired switching back of the switch is prevented until the device to be protected is actually de-energized, by for example being disconnected from the voltage network. This is so because, if the switching mechanism switches from its closed position to its open position due to an increase in temperature, the electrically conductive connection between the two external terminals established by way of the switching mechanism is interrupted. Due to the parallel connection of the heating resistor component, even then a current still flows from one external terminal through the heating resistor component to the other external terminal. This self-holding current ensures heating up and the self-holding current ensures heating up of the heating resistor component. As a result of this, the temperature of the switch, and thus also the temperature of the switching mechanism, is kept above its response temperature, so that switching back to the closed position of the switching mechanism is avoided by the heating resistor component or the development of heat caused by it. Only when the device to be protected is completely switched off or is de-energized in some other way does the heating resistor component cool down, so that the temperature of the switching mechanism can drop to a level below the response temperature, which automatically leads to its switching back to the closed position, in which the electrically conductive connection between the two external terminals is reestablished by way of the switching mechanism.

Unlike in the switches mentioned at the beginning, the upper sides of the two external terminals of the switch already lie inside the housing in a common connection plane. This makes the electrical connection of the switch easier. This also makes the mounting and electrical connection of the heating resistor component easier.

Unlike in the switches mentioned at the beginning, the two contact areas of the heating resistor component are arranged on the same connection side. Due to the additional, already mentioned arrangement of the two upper sides of the external terminals in the same connection plane, the electrical contacting of the heating resistor component with the two external terminals can be carried out on one and the same side of the heating resistor component. For example, the heating resistor component may lie on top of the two external terminals. In this case, gravity already ensures that for most applications a sufficient contact pressure is produced between the heating resistor component and the two external terminals.

This type of arrangement also makes it possible to dispense with a size-based adaptation of the heating resistor component to the exact distance between the electrodes of the switch, as was necessary in the prior art.

According to a refinement, the first contact area and the second contact area of the heating resistor component lie in a common contact plane which is aligned parallel to the connection plane or coincides with the connection plane.

This offers the advantage of flat surface contacting. For example, the heating resistor component may be surface-mounted as a surface-mounted device (SMD) on the two upper sides of the external terminals lying in a common plane. This guarantees good electrical contacting and at the same time allows a space-saving arrangement of the heating resistor component within the switch housing.

According to a further refinement, the first contact area and the second contact area of the heating resistor component are separated from each other by a gap or a contact interruption element.

The contact interruption component may be for example an insulator which is arranged in the connection plane between the two contact areas of the heating resistor component. In principle, however, it is sufficient to provide the heating resistor component on its connection side with two contact areas separated from each other by a gap, which are applied directly to the heating resistor material.

The heating resistor component can therefore be produced at low cost despite the relatively easy type of mounting and electrical contacting that it offers. Accordingly, due to the special type of arrangement and electrical contacting of the heating resistor component, the total costs of the switch do not increase in comparison with the switches with a self-holding function that are disclosed in the prior art mentioned at the beginning.

According to a further refinement, the heating resistor component lies with its first contact area directly on the upper side of the first external terminal or is fastened to it with a material bond by means of surface mounting. Likewise, according to this refinement, the heating resistor component lies with its second contact area directly on the upper side of the second external terminal or is fastened to it with a material bond by means of surface mounting.

The electrical contacting between the heating resistor component and the two external terminals of the switch can therefore take place purely by means of surface contacting. In this case, the contact plane in which the two contact areas of the heating resistor component lie lies in a plane with the connection plane in which the upper sides of the two external terminals lie.

In order to improve the electrical contacting and the mechanical fastening of the heating resistor component, the contact areas of the heating resistor component may alternatively also be connected to the respective external terminal of the switch with a material bond. For example, the contact areas of the heating resistor component may be soldered or welded to the upper sides of the respective external terminal.

According to a further refinement, the heating resistor component is pressed with its connection side against the first and the second external terminal with the aid of a compression spring.

One and the same compression spring thus ensures the contact pressure between the heating resistor component on the one hand and both external terminals on the other hand. This also improves the contacting of the heating resistor component with the two external terminals of the switch, while the spring force of the compression spring at the same time prevents excessive mechanical loads being exerted on the heating resistor component.

Unlike in the switches disclosed in DE 197 52 581 A1 and DE 198 07 288 A1, the compression spring itself does not have to act as a current-carrying component because the current flow in the open position of the switching mechanism takes place directly from one external terminal by way of the heating resistor component to the other external terminal. Accordingly, the compression spring also does not have to be formed from an electrically conductive material, but may also be produced from an electrically insulating material, for example from plastic. This brings further cost-saving possibilities. In addition, the fact that as few components as possible of the switch are de-energized in the open position of the switching mechanism has a further safety advantage.

Preferably, the compression spring acts on the heating resistor component on an upper side of the heating resistor component opposite from the connection side.

In other words, the compression spring is preferably arranged on the side of the heating resistor component opposite from the contact areas. In addition to gravity, the compression spring thus ensures a further increase in contact pressure, whereby the force of the compression spring can act directly on the upper side of the heating resistor component.

In principle, the upper side of the heating resistor component, on which the compression spring acts, may be covered with an insulation layer in order to avoid an electrical short circuit by way of the compression spring, unless it is itself produced from an electrically insulating material.

According to a further refinement, the heating resistor component is spatially separated from the switching mechanism by at least one wall inside the housing.

On the one hand, this guarantees that the heating resistor component is electrically insulated from the switching mechanism. On the other hand, this guarantees that mechanical collisions between the switching mechanism and the heating resistor component cannot occur even in the event of vibrations. The heating resistor component is preferably arranged with a form fit in an extra chamber inside the switch housing.

Preferably, the heating resistor component comprises a PTC material.

Particularly preferably, the heating resistor component comprises a solid cuboidal block of PTC material, on one side of which, which is referred to here as the "connection side", two metal contact elements made of metal, on which the two contact areas of the heating resistor component are located, are arranged at a distance from each other.

According to a further refinement, the housing has an insulating material carrier, which carries a first stationary electrode electrically connected to the first external terminal and a second stationary electrode electrically connected to the second external terminal and keeps them at a distance from each other along a vertical direction, wherein the temperature-dependent switching mechanism is arranged inside the housing in a recess of the insulating material carrier between the first and the second electrode, wherein the first electrode is electrically connected to the first external terminal by way of a line connecting element aligned transversely in relation to the two electrodes and arranged in the housing, and wherein the first and the second external terminal are led through the insulating material carrier at the same height with respect to the vertical direction.

The line connecting element which is provided inside the housing and electrically connects the first electrode to the first external terminal internally in the switch makes it possible to lead the two external terminals through the insulating material carrier with a sealing effect not at different heights, as before, but at the same height. The sealing between the external terminals and the insulating material carrier can thus take place at the same height, which makes the general mechanical sealing of the switch interior much easier and improves it overall.

In addition, the external terminals do not have to be bent to bring them to the same height or into one and the same plane. This makes the electrical connection of the switch possible in an easy way without reworking the external terminals in an advantageous manner.

The line connecting element is preferably a separate component, which acts as an electrical conduction carrier between the first electrode and the first external terminal and internally in the switch is electrically connected to the first electrode on the one hand and electrically connected to the first external terminal on the other hand.

Similar to the switching mechanism, the heating resistor component according to this refinement is also preferably arranged in the insulating material carrier. Particularly preferably, the heating resistor component is arranged in a separate recess in the insulating material carrier, separated from the switching mechanism by at least one wall.

According to a further refinement, the first and the second external terminal are arranged parallel alongside each other inside and outside the insulating material carrier.

According to this refinement, the two external terminals are thus preferably led through the insulating material carrier parallel to each other at the same height. This makes the electrical connection of the switch much easier, since the two external terminals run parallel alongside each other at the same height in the manner of a plug.

According to a further refinement, the insulating material carrier forms a lower part of the housing, which is closed by a cover part.

The cover part is preferably formed as an extra component which is fastened to the insulating material carrier which forms the lower part of the housing, for example by embossing an upper edge of the lower part. Depending on the refinement, the cover part may be formed from an electrically conductive material, for example metal, or an electrically insulating material, for example plastic.

In a first alternative refinement, the cover part is made of metal, wherein the cover part forms the first electrode. According to this refinement, the cover part thus has two basic functions. On the one hand, as part of the switch housing, it serves to shield the inside of the housing, in which the switching mechanism and the insulating material carrier are located, from the outside world and mechanically seal it. On the other hand, it serves at the same time as the first electrode for the temperature-dependent switching mechanism. This allows a space-saving design of the switch.

According to an alternative refinement, the cover part is made of plastic, wherein the first electrode is arranged clamped between the cover part and the line connecting element. In comparison with the aforementioned refinement, in which the cover part is made of metal and forms an electrode of the switching mechanism, an extra component, which forms the first electrode, is therefore necessary here. On the other hand, the housing, which in addition to the lower part or the insulating material carrier has the cover part, may be completely made of plastic, which in particular allows low-cost production of the switch.

The connection plane is preferably aligned orthogonally in relation to the vertical direction. The vertical direction is the direction along which the two electrodes of the switch are kept at a distance from each other. The switching mechanism is arranged between the first electrode and the second electrode in the vertical direction.

It is in this case also preferred that the first electrode is arranged on a first side of the switching mechanism and the second electrode, the first and the second external terminal are arranged on a second side of the switching mechanism lying opposite in the vertical direction.

The first electrode is preferably arranged above the switching mechanism in the vertical direction, while the two external terminals together with the second electrode are arranged on the underside of the switching mechanism lying opposite in the vertical direction. This has the advantage that the two external terminals are led of the insulating material carrier as far down as possible, near the underside of the switch housing.

According to a further refinement, at least a part of the second electrode is arranged in the connection plane, wherein at least a part of the first electrode is arranged parallel to the connection plane and runs parallel to it.

On the one hand, this allows a design of the switch that is a very compact and flat in the vertical direction. On the other hand, the second electrode can then be integrally connected to the second external terminal, since it lies in one and the same connection plane with it. For example, one and the same metal sheet can be used as the second electrode and the second external terminal. This still keeps the number of components of the switch to a minimum and makes the installation of the second electrode or the second external terminal easier.

According to a further refinement, the temperature-dependent switching mechanism has a temperature-dependent switching element, which is configured to change its geometric shape depending on its temperature in order to switch the switching mechanism between the closed position and the open position.

The temperature-dependent switching element is preferably a bimetal or trimetal component.

According to a further refinement, the temperature-dependent switching mechanism has a spring element, which is configured to produce the electrically conductive connection in the closed position of the switching mechanism, by being electrically conductively connected to the first external terminal and generating a mechanical contact pressure, with which a movable contact part of the switching mechanism is pressed against a stationary contact part electrically conductively connected to the second external terminal.

The provision of a spring element in addition to a temperature-dependent switching element within the switching mechanism has the advantage that the temperature-dependent switching element is relieved electrically and mechanically. In addition, this can increase the contact pressure in the closed position of the switching mechanism, which in particular improves the resistance of the switch to mechanical shock. Depending on the design of the switching mechanism, as mentioned above, the temperature-dependent switching element and the temperature-independent spring element in the switching mechanism may be mechanically and electrically connected in series or in parallel with each other.

It goes without saying that the features mentioned above and still to be explained below can be used not only in the respectively specified combinations but also in other combinations or on their own without departing from the scope and scope of the present disclosure.

DESCRIPTION OF PREFERRED EMBODIMENTS

Figure 1:
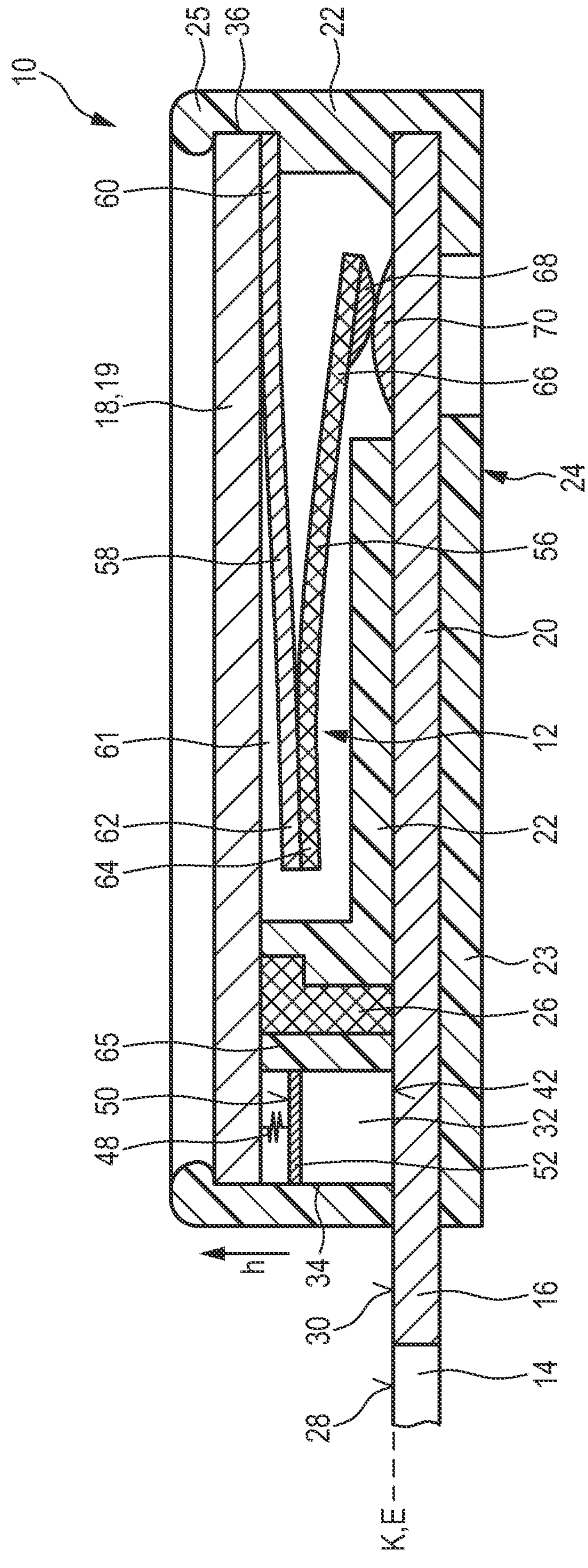
FIG. 1 shows a schematic sectional view of a first exemplary embodiment of the switch, wherein the temperature-dependent switching mechanism of the switch is in its closed position.
Figure 2:
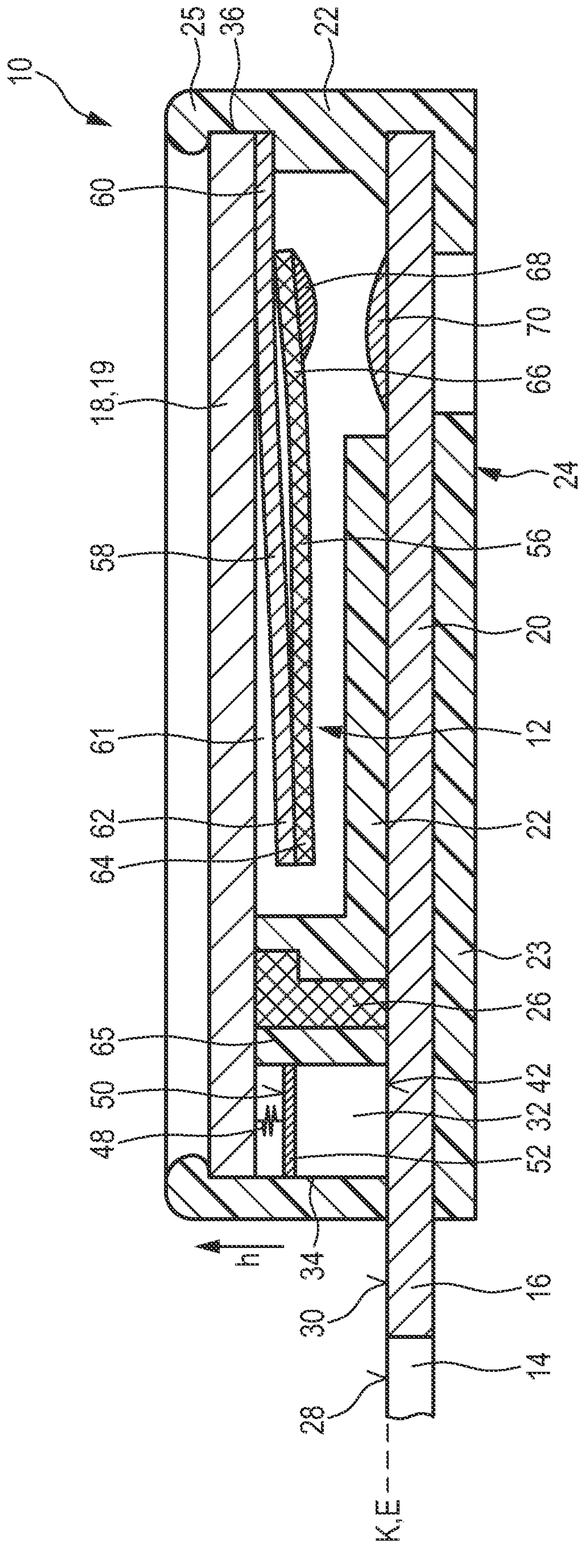
FIG. 2 shows a schematic sectional view of the exemplary embodiment of the switch shown in FIG. 1, wherein the temperature-dependent switching mechanism of the switch is in its open position.

FIGS. 1 and 2 each shows a schematic sectional view of a first exemplary embodiment of the temperature-dependent switch. The switch is denoted therein in its entirety by the reference numeral 10.

FIG. 1 shows the closed position of switch 10. FIG. 2 shows the open position of switch 10.

The switch 10 has a temperature-dependent switching mechanism 12, which is configured to switch the switch 10, depending on its temperature, from its closed position to its open position and vice versa.

In the closed position of the switch shown in FIG. 1, the switching mechanism 12 establishes an electrically conductive connection between the two external terminals 14, 16 of the switch 10. In the open position of the switch 10 shown in FIG. 2, by contrast, the switching mechanism 12 disconnects the electrically conductive connection between the first external terminal 14 and the second external terminal 16.

The first external terminal 14 is electrically conductively connected to a first electrode 18. In the first exemplary embodiment shown in FIGS. 1 and 2, this first electrode 18 at the same time forms the cover of the switch 10. In other words, the first electrode 18 is formed by a cover part 19 made of metal.

The second external terminal 16 is electrically conductively connected to a second electrode 20. In the exemplary embodiment shown here, the second electrode 20 is connected in one piece to the second external terminal 16. In other words, one and the same metal sheet forms the second electrode 20 and the second external terminal 16.

The two electrodes 18, 20 are formed as flat planar electrodes. The switching mechanism 12 is arranged inside the switch 10 in the space between the two electrodes 18, 20.

The two electrodes 18, 20 are kept at a distance from each other by an insulating material carrier 22, which forms a part of the housing 24 of the switch 10. The insulating material carrier 22 carries the two electrodes 18, 20 and fixes them in their arrangement. The two electrodes 18, 20 are therefore immovable, stationary electrodes.

The two electrodes 18, 20 are kept at a distance from each other along a vertical direction by the insulating material carrier 22. This vertical direction, which is indicated in FIGS. 1 and 2 by an arrow h, runs transversely, preferably orthogonally, in relation to the two electrodes 18, 20.

The first electrode 18 is arranged on an upper side (referred to here as the "first side") of the switching mechanism 12, while the second electrode 20 is arranged on the underside (referred to here as the "second side") of the switching mechanism 12 lying opposite in the vertical direction h.

The insulating material carrier 22 is formed essentially in a pot shape. It forms the lower part 23 of the housing 24. The insulating material carrier 22 is formed around the second electrode 20 by overmoulding or potting in such a way that the second electrode 20 is an integral component of the lower housing part 23.

The lower part 23 of the housing is closed by the first electrode 18 formed as the cover part 19. The cover part 19 is surrounded all around, along its entire circumference, by the insulating material carrier 22 and is held captively on it by a hot-embossed upper edge of the insulating material carrier 22 and the lower part 23.

In the insulating material carrier 22, a line connecting element 26 made of electrically conductive material is also integrated. This line connecting element 26 may be for example a conduction plate or some other electrical conductor which is integrated in the insulating material carrier 22, and thus, despite its arrangement inside the housing 24, is electrically insulated from the switching mechanism 12 also arranged inside the housing 24. In the exemplary embodiment shown here, the line connecting element 26 is formed L-shaped in cross section.

The line connecting element 26 connects the first electrode 18 to the first external terminal 14. In this way it is possible, despite the arrangement of the two electrodes 18, 20 offset in the vertical direction h, nevertheless to lead the two external terminals 14, 16 through the insulating material carrier 22 from the inside to the outside at the same height. The first external terminal 14 is accordingly arranged "behind" the second external terminal 16 in the sectional views shown in FIGS. 1 and 2, since the first external terminal 14 is arranged at the same height as the second external terminal 16 and runs parallel to the second external terminal 16. The latter can be seen in particular by joint consideration with the plan view from above shown in FIG. 4.

Figure 4:
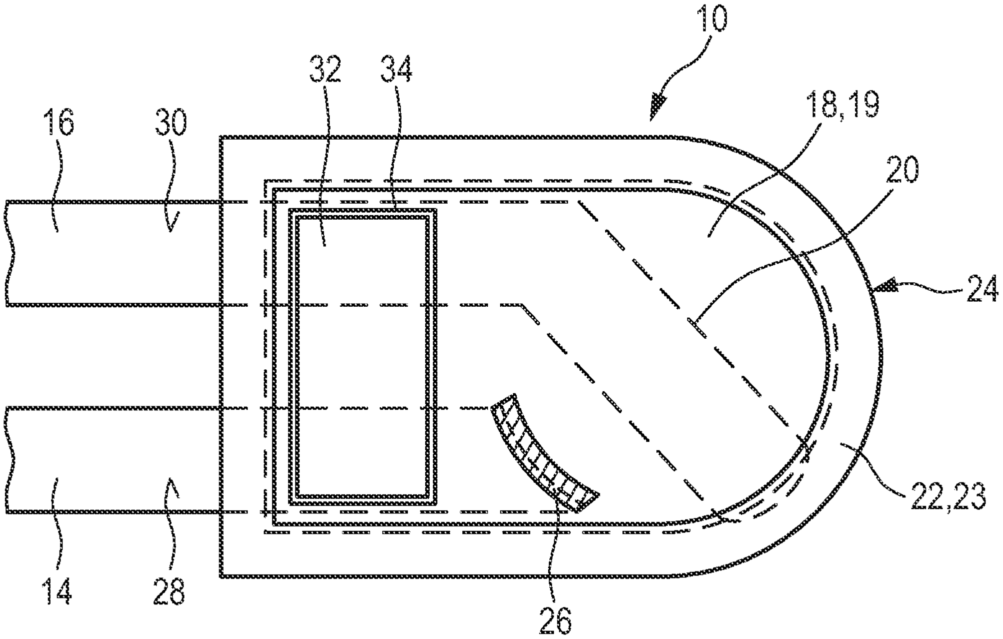
FIG. 4 shows a schematic plan view of the exemplary embodiment of the switch shown in FIG. 1.

As shown in FIG. 4, the two external terminals 14, 16 run parallel alongside each other outside the insulating material carrier 22 and, due to the line connecting element 16, can be arranged in a common connection plane E, which is indicated in FIGS. 1 and 2 by a dashed line. More specifically, the two upper sides 28, 30 of the two external terminals 14, 16 lie in particular in the common connection plane E. The two external terminals 14, 16 are preferably formed as flat or plate-shaped connections.

While the upper side of the second electrode 20 in the first exemplary embodiment shown in FIGS. 1 and 2 is also arranged in the connection plane E, the first electrode 18 is arranged offset parallel to the connection plane E in the vertical direction h. The connection plane E is preferably aligned orthogonally in relation to the vertical direction h.

An electrical heating resistor component 32 lies on top of the two external terminals 14, 16. This heating resistor component 32 is electrically connected in parallel with the switching mechanism 12 and is also arranged inside the housing 24 in a separately provided recess 34 of the insulating material carrier 22 laterally alongside the switching mechanism 12, but spatially separated from it.

The heating resistor component 32 serves essentially for the self-holding functions with which the switch 10 is kept open after opening by the switching mechanism 12 until the device to be protected by the switch 10 is de-energized independently of the switch 10.

The heating resistor component 32 has an approximately cuboidal component 36 made of PTC material. On this PTC block 36, two contact elements 38, 40 of conductive material are arranged. These two contact elements 38, 40 are for example respectively formed as a metal sheet, which is fastened to the PTC block 36. The two contact elements 38, 40 are arranged on the same side 42 of the PTC block 36. This side 42 is referred to as the "connection side" of the heating resistor component 32.

On the connection side 42, each of the two contact elements 38, 40 respectively has a contact area 44, 46. The two contact areas 44, 46 lie in one and the same contact plane K, which in the installed state of the heating resistor component 32 coincides with the connection plane E. The first contact area 44, arranged on the first contact element 38, serves for the electrical contacting of the heating resistor component 32 at the first external terminal 14. The second contact area 46, arranged on the second contact element 40, serves for the electrical contacting of the heating resistor component 32 with the second external terminal 16.

The heating resistor component 32 lies flat on top of the two external terminals 14, 16 of the switch 10, wherein the first contact area 44 lies on the upper side 28 of the first external terminal 14 and the second contact area 46 lies on the upper side 30 of the second external terminal 16.

To increase the contact pressure between the two contact areas 44, 46 and the upper sides 28, 30, the heating resistor component 32 is pressed with its connection side 42 against the two external terminals 14, 16 with the aid of a compression spring 48. This compression spring 48 acts on the heating resistor component 32 on an upper side 50 lying opposite from the connection side 42. On the upper side 50, the heating resistor component 32 may be covered by an insulation layer 52 to electrically insulate the PTC block 36 from the compression spring 48.

Figure 3A:
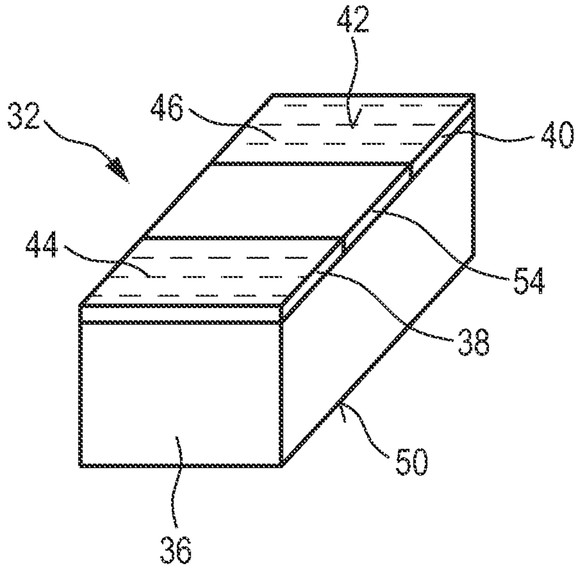
FIG. 3A shows a schematic perspective representation of an exemplary embodiment of a heating resistor component used in the switch.
Figure 3B:
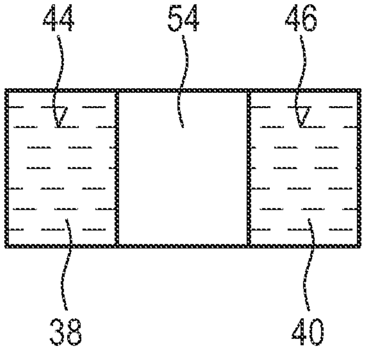
FIG. 3B shows a plan view from below of the heating resistor component shown in FIG. 3A.

For the insulation of the two contact elements 38, 40 from each other, a contact interruption element 54 may also be arranged between them (see FIGS. 3A and 3B). As an alternative to this, the two contact elements 38, 40 of the heating resistor component 32 are separated from each other by a gap (air gap).

The basic arrangement of the two external terminals 14, 16 and the heating resistor component 32 can also be seen from FIG. 4. FIG. 4 shows a plan view from above of the switch 10, wherein some components arranged inside the housing 24 (for example components 20 and 26) are indicated by dashed lines. The second electrode 20, which is indicated in FIG. 4 by dashed lines, runs obliquely or in an angled manner in relation to the second external terminal 16 but, as already mentioned, lies together with the second external terminal 16 in the connection plane E. However, the second electrode 20 does not necessarily have to be run in an angled manner or obliquely in relation to the second external terminal 16, as shown in FIG. 4. The second electrode 20 may in principle also be in line with the first external terminal 16. In such a case it is preferred that the second external terminal 16 runs together with the second electrode 20 in the radial direction of the switch housing 24. If the second external terminal 16 is arranged in the middle, i.e. offset parallel downwards in the direction of the first external terminal 14 with respect to the position shown in FIG. 4, a parallel alignment of the two external terminals 14, 16 is also possible. With reference to FIG. 4, the second external terminal 16 and the second electrode 20 would then be arranged in a line parallel to the first external terminal 14 in the middle of the housing.

Also in the exemplary embodiments of the switch 10 shown in FIGS. 5-8, the two upper sides 28, 30 of the external terminals 14, 16 are arranged in a common connection plane and a heating resistor component 32 is provided to implement of the self-holding function of the switch 10, wherein the heating resistor component 32 lies with its two contact areas 44, 46, also lying in a common contact plane K, on top of the upper sides 28, 30 of the two external terminals 14, 16. This basic principle for arranging and contacting the heating resistor component 32 as well as the design of the heating resistor component 32 outlined in principle in FIGS. 3A and 3B are thus also implemented in the exemplary embodiments shown in FIGS. 5-8. The two exemplary embodiments shown in FIGS. 5-8 differ from the first exemplary embodiment shown in FIGS. 1-2 in the functional and structural type of design of the switching mechanism 12 and in some features of the housing 24 to be explained below.

In the first exemplary embodiment shown in FIGS. 1 and 2, the switching mechanism 12 has a temperature-dependent switching element 56, which is electrically and mechanically connected in series with a spring element 58. The temperature-dependent switching element 56 is formed in the first exemplary embodiment as a bimetal element, which has the shape of an elongated spring tongue. The spring element 58 is made of metal and also formed as an elongated spring tongue.

A first end 60 of the spring element 58 is fastened to the first electrode 18 with a material bond. Starting from this first end 60, the spring element 58 protrudes in the manner of a cantilever into the cavity formed by the recess 61 inside the switch 10. The opposite second, free end 62 of the spring element 58 is fastened with a material bond (e.g. by soldering or welding) to a first end 64 of the temperature-dependent switching element 56. At a second end 66 opposite from the first end 64, the temperature-dependent switching element 56 carries a movable contact part 68, which interacts with a stationary contact part 70 arranged on the second electrode 20.

In the closed position of the spring element 58 and the temperature-dependent switching element 56, the movable contact part 68 is pressed against the stationary contact part 70, whereby the switch 10 is closed and the electrically conductive connection between the two external terminals 14, 16 is established.

If, starting from this, the temperature of the switching element 56 increases as a result of an increased current flow through the switch 10 or as a result of an increased outside temperature, first the creeping phase of the switching element 56 begins, a phase in which its spring force operating against the force of the spring element 58 subsides. Due to the mechanical series connection of the switching element 56 with the spring element 58, this gradual decrease in the force of the switching element 56 is compensated by the spring element 58, so that the movable contact part 68 is still pressed against the stationary contact part 70.

If the temperature of the switching element 56 then increases further up to or beyond the response temperature of the switching element 56, the switching element 56 snaps into its high-temperature configuration shown in FIG. 2, whereby the switching mechanism 12 is brought into its open position and the electrically conductive connection between the two external terminals 14, 16 is interrupted.

In the open position of the switch 10 shown in FIG. 2, therefore, no current flows any longer from the first external terminal 14 by way of the switching mechanism 12 to the second external terminal 16. However, a small residual current still flows between the two external terminals 14, 16 by way of the heating resistor component 32. This residual current causes the heating resistor component 32 to heat up automatically. The resulting development of heat is also transferred to the switching mechanism 12 and the associated temperature-dependent switching element 56. Accordingly, the heating resistor component 32 brings about the so-called self-holding of the switch 10, by which the switch 10 is kept permanently open until no voltage from the outside is present any longer between the two external terminals 14, 16. This is usually only the case when the device to be monitored by switch 10 is de-energized, for example by removing it from the power supply.

Without the heating resistor component 32, which is electrically connected in parallel with the switching mechanism 12, the switching mechanism 12 would automatically switch back to its closed position shown in FIG. 1 as soon as the temperature of the device to be monitored by the switch 10, and thus also the temperature of the switch 10, decreases again.

Figure 5:
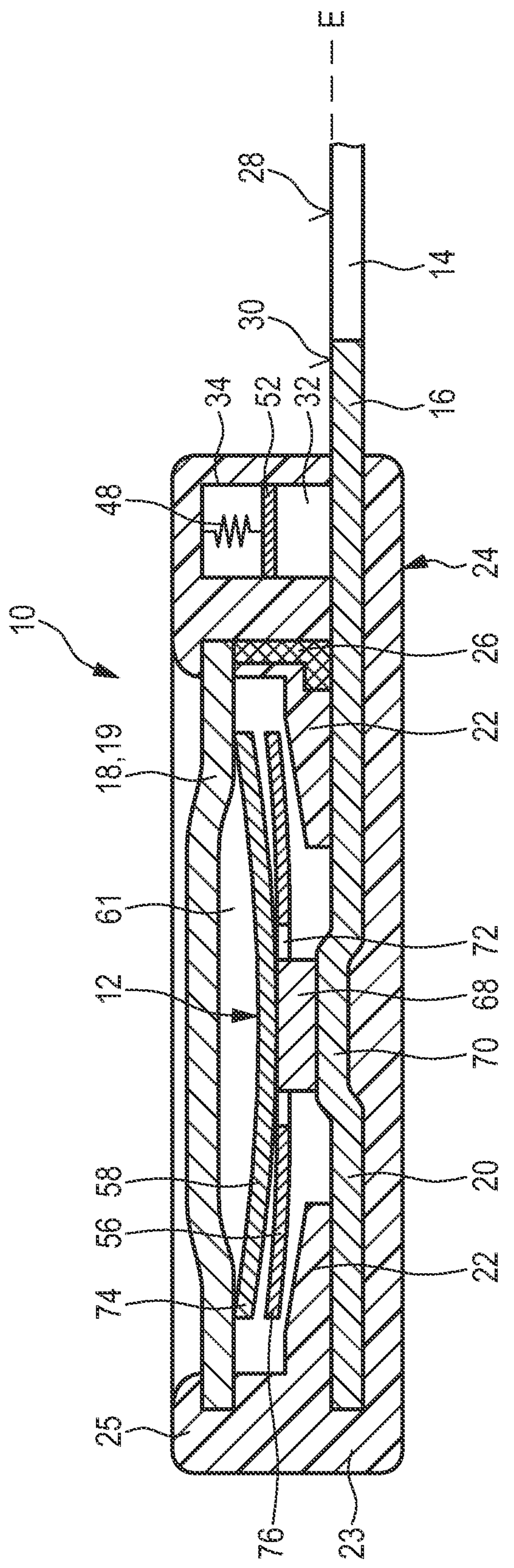
FIG. 5 shows a schematic sectional view of a second exemplary embodiment of the switch, wherein the temperature-dependent switching mechanism of the switch is in its closed position.
Figure 6:
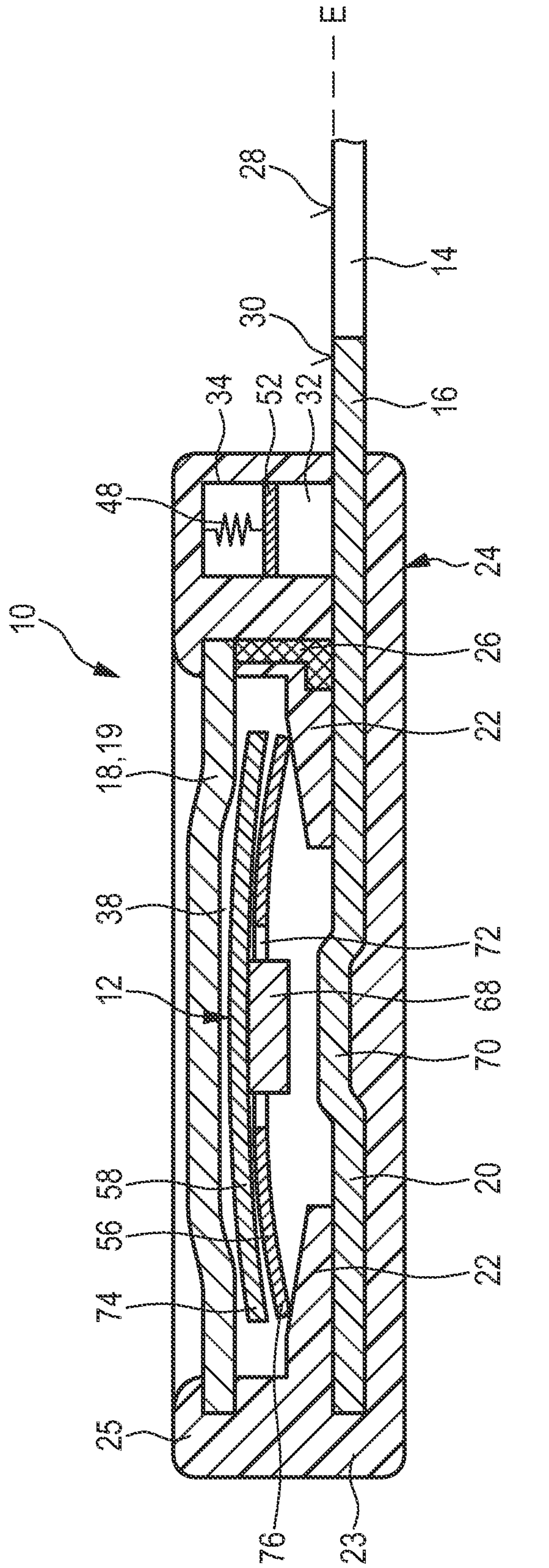
FIG. 6 shows a schematic sectional view of the exemplary embodiment of the switch shown in FIG. 5, wherein the temperature-dependent switching mechanism of the switch is in its open position.

In the second exemplary embodiment shown in FIGS. 5 and 6, the temperature-dependent switching behaviour of the switch 10 is brought about by a structurally and functionally differently designed switching mechanism 12. However, the self-holding principle explained above which is brought about by the heating resistor component 32 is also retained here. The aforementioned type of arrangement of the heating resistor component 32 with its one-sided contacting with the two external terminals 14, 16 is also implemented in the exemplary embodiment of the temperature-dependent switch shown in FIGS. 5 and 6.

In the switch 10 shown in FIGS. 5 and 6, the switching mechanism 12 comprises a temperature-dependent switching element 56 and a temperature-dependent spring element 58. The switching element 56 is formed here as a disc-shaped bimetal element, which is why it is also referred to as a bimetal disc. The spring element 58 is also disc-shaped and preferably formed as a spring snap disc which has two temperature-independent stable configurations, between which it snaps back and forth under the effect of force.

In the second exemplary embodiment shown in FIGS. 5 and 6, the switching element 56 and the spring element 58 are electrically and mechanically connected in parallel with each other. The movable contact part 68 is fastened to the spring element 58 with a material bond. The switching element 56 formed as a bimetallic disc is slipped over the movable contact part 68 with a hole 72 provided in its centre.

The cover part 19, which, as in the first embodiment, is preferably made of metal, acts as the first electrode 18. As before, the first electrode 18 is electrically conductively connected to the first external terminal 14 by way of the line connecting element 26, which is embedded in the insulating material carrier 22.

A metal sheet which is embedded in the insulating material carrier 22 and, at least in certain portions, lies with the external terminals 14, 16 in the connection plane E, in which the contact areas 44, 46 of the heating resistor component 32 are also arranged, acts as the second electrode 20.

Unlike in the first exemplary embodiment, the stationary contact part 70 is not formed as a separate component which is connected to the second electrode 20 with a material bond, but is formed by an elevated central portion of the second electrode 20 itself.

In the closed position of the switch 10 shown in FIG. 5, the disc-shaped spring element 58 is supported with its outer edge 74 on the inner side of the cover part 19, and thus on the first electrode 18. In this closed position of the switch 10, the temperature-dependent switching element 56 can be mounted free from any forces and protrude freely with its outer edge 76 into the recess 61 formed in the interior of the switch 10. Unlike in the first exemplary embodiment, the switching element 56 therefore does not have current flowing through it in the closed position of the switch 10.

In the closed position of the switch 10, the current flows from the first external terminal 14 by way of the line connecting element 26 into the first electrode 18 and from there by way of the spring element 58, the movable contact part 68, the stationary contact part 70 and the second electrode 20 to the second external terminal 16.

Likewise, in the closed position of the switch shown in FIG. 5, the temperature-dependent switching element 56 does not contribute to the contact pressure with which the movable contact part 68 is pressed against the stationary contact part 70. In the design of the switching mechanism 12 shown in FIGS. 5 and 6, this closing pressure is only brought about by the spring element 58.

If the temperature of the switch 10, and thus also of the switching mechanism 12, increases to the response temperature of the switching element 56 or beyond this, the switching element 56 snaps from its convex position shown in FIG. 5 to its concave position shown in FIG. 6. In this case, the switching element 56 is supported with its outer edge 76 on the insulating material carrier 22 and presses the spring element 58 out of its concave position shown in FIG. 5 into its convex position shown in FIG. 6, whereby the movable contact part 68 is lifted off the stationary contact part 70 and the electrically conductive connection established by the switching mechanism 12 is opened.

In the open position of the switching mechanism 12 shown in FIG. 6, the current flows between the first external terminal 14 and the second external terminal 16 only through the heating resistor component 32, which, as previously mentioned, is heated and keeps the switch 10 in the open position until the power supply is completely interrupted.

Figure 7:
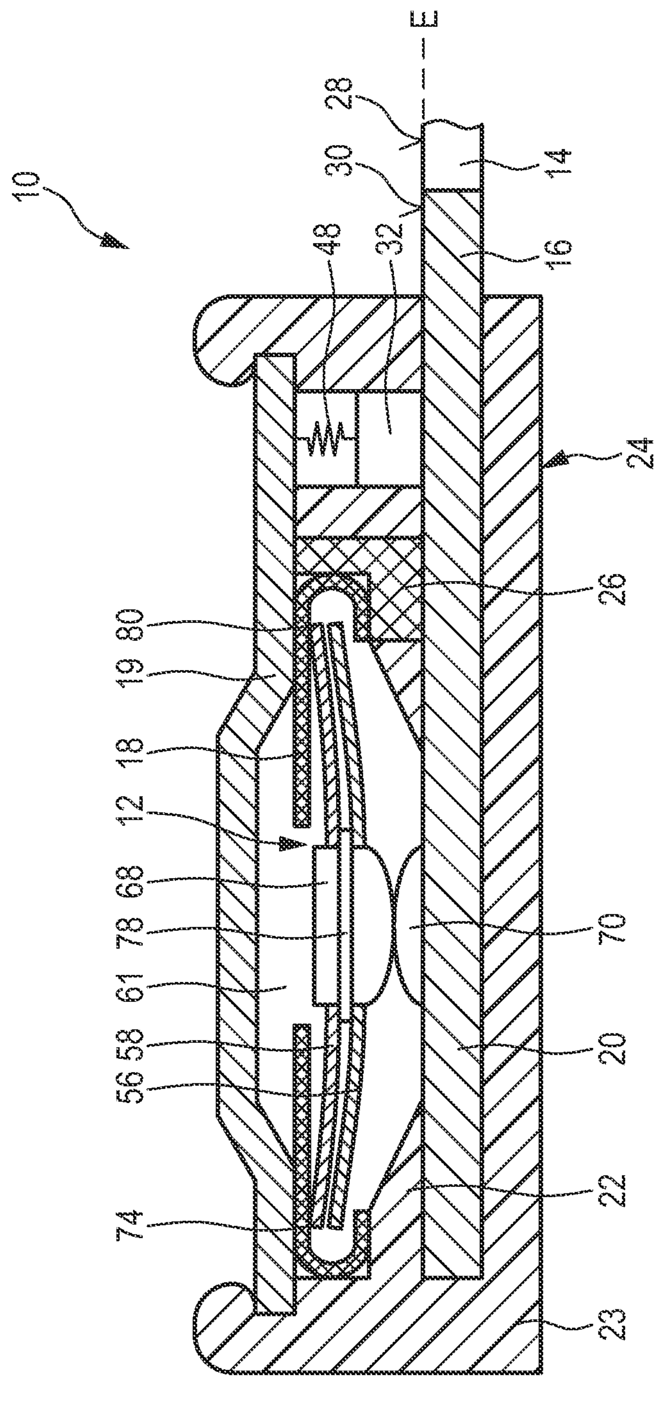
FIG. 7 shows a schematic sectional view of a third exemplary embodiment of the switch, wherein the temperature-dependent switching mechanism of the switch is in its closed position.
Figure 8:
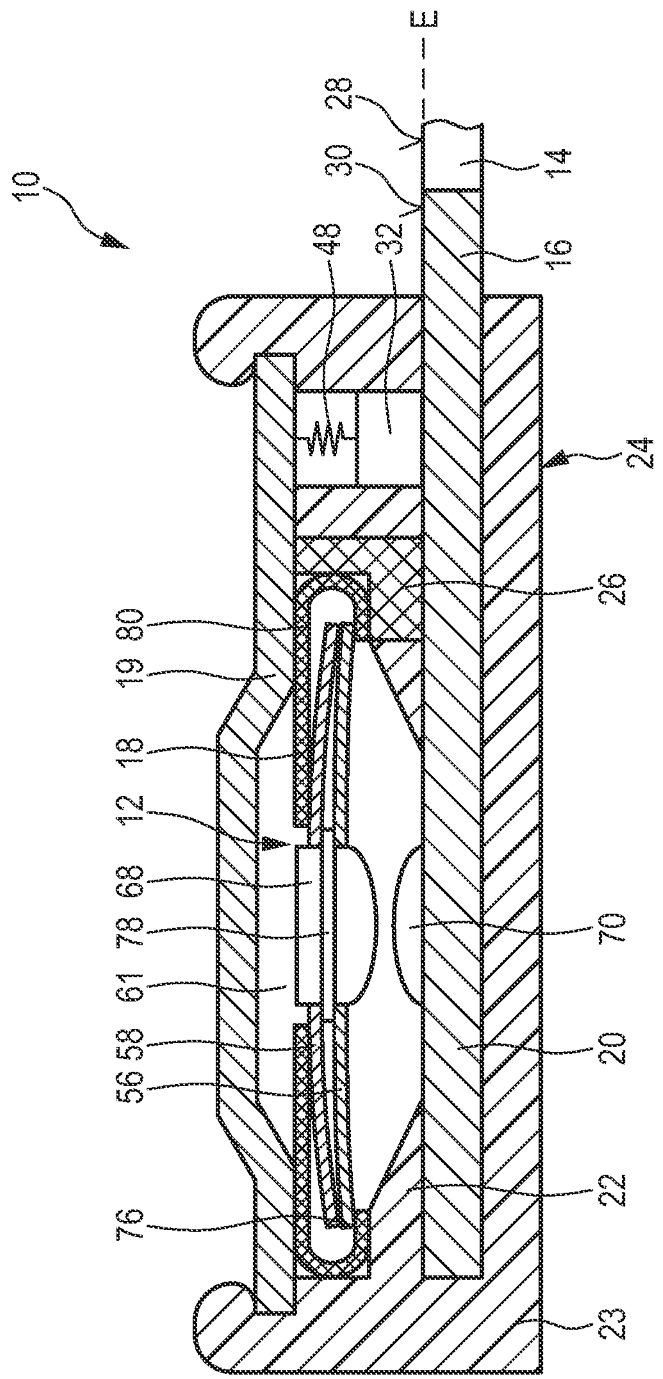
FIG. 8 shows a schematic sectional view of the exemplary embodiment of the switch shown in FIG. 7, wherein the temperature-dependent switching mechanism of the switch is in its open position.

In the third exemplary embodiment of the switch 10 shown in FIGS. 7 and 8, the switching mechanism 12 is formed functionally similarly to the switching mechanism 12 according to the second exemplary embodiment of the switch 10 shown in FIGS. 5 and 6. The switching element 56 and the spring element 58 are mechanically and electrically connected in parallel. In addition, also in the third exemplary embodiment shown in FIGS. 7 and 8, the switching element 56 and the spring element 58 are disc-shaped or circular disc-shaped and connected by their respective centre to the movable contact part 68.

However, the switching element 56 and the spring element 58 in this case lie from opposite sides against a circumferential collar 74 forming the outer edge of the movable contact part 68.

In addition to the switching element 56, the spring element 58 and the movable contact part 68, the switching mechanism 12 according to the third exemplary embodiment of the switch 10 shown in FIGS. 7 and 8 has a switching mechanism housing 80. This switching mechanism housing 80 is preferably made of metal. It is used to house the switching mechanism 12 or the switching mechanism unit formed by the switching element 56, the spring element 58 and the movable contact part 68.

The switching mechanism housing 80 is formed as a partially open housing and preferably made of metal. The switching mechanism unit formed by the switching element 56, the spring element 58 and the movable contact part 68 is held captively, but with play, in the switching mechanism housing 80.

With the aid of such a switching mechanism housing 76 it is possible to pre-produce the switching mechanism 12 as a semi-finished product, to keep it as an item in stock and then to insert it as a whole into the switch housing 24.

In the closed position of the switch shown in FIG. 7, the spring element 58 is supported with its outer edge 74 on the inner side of the switching mechanism housing 80 and presses the movable contact part 68 against the stationary contact part 70. Also in this exemplary embodiment of the switching mechanism 12, in the closed position of the switch 10, the switching element 56 is mechanically mounted free from any forces and does not have current flowing through it.

In the switch 10 shown in FIGS. 7 and 8, the switching mechanism housing 80 acts as the first electrode 18 of the switching mechanism 12. Accordingly, the cover part 19 does not have to be formed here from electrically conductive material, but may for example be made of plastic, e.g. from a similar or even the same material as the insulating material carrier 22, which forms the lower part 23 of the housing 24.

When the cover part 19 is made of plastic, the heating resistor component 32 also does not have to be electrically insulated with respect to the compression spring 48, for which reason it is possible to dispense with the insulation layer 52. The heating resistor component 32 also lies here with its contact areas 44, 46 on the underside or connection side 42 directly against the upper sides 28, 30 of the external terminals 14, 16.

The switching mechanism housing 80 acting as the first electrode 18 lies on the line connecting element 26, so that here too the line connecting element 26 provided internally in the switch establishes the electrical contact between the first electrode 18 and the first external terminal 14 and allows attachment of the two external terminals 14, 16 at the same height or leading out of the external terminals 14, 16 from the insulating material carrier 22 at the same height.

The current flow in the closed position of the switch shown in FIG. 7 takes place from the first external terminal 14 by way of the line connecting element 26, the switching mechanism housing 80 (the first electrode 18), the spring element 58, the movable contact part 68, the stationary contact part 70 and the second electrode 20 to the second external terminal 16.

In the open position of the switch 10 shown in FIG. 8, the temperature-dependent switching element 56 is supported with its outer edge 76 on the inner side of the switching mechanism housing 80 and presses the movable contact part 68 upwards, whereby the movable contact part 68 is lifted off the stationary contact part 70 and the current flow by way of the switching mechanism 12 is interrupted. Thus, the spring element 58 also snaps from its concave position shown in FIG. 7 to its convex position shown in FIG. 8.

The open position is also kept open here by the self-holding brought about by the heating resistor component 32 until there is no voltage any longer between the two external terminals 14, 16.

Accordingly, the three exemplary embodiments shown here differ essentially in the design of the switching mechanism 12, while the principle of the self-holding brought about by the heating resistor component 32, as well as the type of arrangement and electrical contacting of the heating resistor component 32 and the attachment of the two external terminals 14, 16 in a common connection plane E is implemented in a similar manner in principle in all three exemplary embodiments by providing a line connecting element 26 arranged inside the switch.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A temperature-dependent switch, comprising a housing and a temperature-dependent switching mechanism arranged in the housing, wherein the temperature-dependent switching mechanism is configured to switch, depending on its temperature, between a closed position, in which the temperature-dependent switching mechanism establishes an electrically conductive connection between a first external terminal and a second external terminal, and an open position, in which the temperature-dependent switching mechanism disconnects the electrically conductive connection, wherein the first external terminal and the second external terminal are led parallel alongside each other out of the housing in such a way that an upper side of the first external terminal and an upper side of the second external terminal lie in a common connection plane, and wherein an electrical heating resistor component is arranged inside the housing, the electrical heating resistor component being electrically connected in parallel to the temperature-dependent switching mechanism and having on a connection side a first contact area, which electrically contacts the upper side of the first external terminal, and a second contact area, which electrically contacts the upper side of the second external terminal, wherein the housing comprises an insulating material carrier, which carries a first stationary electrode electrically connected to the first external terminal and a second stationary electrode electrically connected to the second external terminal and keeps the first stationary electrode and the second stationary electrode at a distance from each other along a vertical direction, wherein the temperature-dependent switching mechanism is arranged inside the housing in a recess of the insulating material carrier between the first stationary electrode and the second stationary electrode, wherein the first stationary electrode is electrically connected to the first external terminal by a line connecting element that is aligned transversely to the first stationary electrode and the second stationary electrode and that is arranged in the housing, and wherein the first external terminal and the second external terminal are led through the insulating material carrier in the common connection plane that is aligned transversely to the vertical direction.

2. The temperature-dependent switch according to claim 1, wherein the first contact area and the second contact area lie in a common contact plane which is aligned parallel to or coplanar with the common connection plane.

3. The temperature-dependent switch according to claim 1, wherein the first contact area and the second contact area are separated from each other by a gap or a contact interruption element.

4. The temperature-dependent switch according to claim 1, wherein the electrical heating resistor component lies with its first contact area directly on the upper side of the first external terminal or is fastened to the upper side of the first external terminal, and wherein the electrical heating resistor component lies with its second contact area directly on the upper side of the second external terminal or is fastened to the upper side of the second external terminal.

5. The temperature-dependent switch according to claim 1, further comprising a spring that presses the connection side of the electrical heating resistor component against the first external terminal and the second external terminal.

6. The temperature-dependent switch according to claim 5, wherein the spring acts on the electrical heating resistor component on an upper side of the electrical heating resistor component opposite the connection side.

7. The temperature-dependent switch according to claim 1, wherein the electrical heating resistor component is spatially separated from the temperature-dependent switching mechanism by at least one wall inside the housing.

8. The temperature-dependent switch according to claim 1, wherein the electrical heating resistor component comprises a PTC material.

9. The temperature-dependent switch according to claim 1, wherein the first external terminal and the second external terminal are arranged parallel alongside each other inside and outside the insulating material carrier.

10. The temperature-dependent switch according to claim 1, wherein the insulating material carrier forms a lower part of the housing, which is closed by a cover part.

11. The temperature-dependent switch according to claim 1, wherein the common connection plane is aligned orthogonally to the vertical direction.

12. The temperature-dependent switch according to claim 1, wherein the first stationary electrode is arranged on a first side of the temperature-dependent switching mechanism, and wherein the second stationary electrode, the first external terminal, and the second external terminal are arranged on a second side of the temperature-dependent switching mechanism opposite first side.

13. The temperature-dependent switch according to claim 1, wherein the temperature-dependent switching mechanism comprises a temperature-dependent switching element, which is configured to change its geometric shape depending its temperature in order to switch the temperature-dependent switching mechanism between the closed position and the open position.

14. The temperature-dependent switch according to claim 1, wherein the temperature-dependent switching mechanism comprises a spring element, which is configured to produce the electrically conductive connection in the closed position of the temperature-dependent switching mechanism, by being electrically connected to the first external terminal and generating a mechanical contact pressure, with which a movable contact part of the temperature-dependent switching mechanism is pressed against a stationary contact part that is electrically connected to the second external terminal.

* * * * *